United States Patent
Kitou et al.

(10) Patent No.: US 9,381,841 B2
(45) Date of Patent: Jul. 5, 2016

(54) SEAT FRAME FOR CONVEYANCE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Hidekazu Kitou, Seto (JP); Yuusuke Akiyoshi, Okazaki (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/495,054

(22) Filed: Sep. 24, 2014

(65) Prior Publication Data

US 2015/0091355 A1  Apr. 2, 2015

(30) Foreign Application Priority Data

Sep. 30, 2013 (JP) .................................. 2013-204172

(51) Int. Cl.
| | | |
|---|---|---|
| A47C 7/02 | (2006.01) |
| B60N 2/68 | (2006.01) |
| B60N 2/20 | (2006.01) |
| B60N 2/22 | (2006.01) |

(52) U.S. Cl.
CPC .. B60N 2/68 (2013.01); B60N 2/20 (2013.01); B60N 2/22 (2013.01)

(58) Field of Classification Search
CPC ............... B60N 2/68; B60N 2/20; B60N 2/22
USPC ...................................... 297/452, 18, 45.202
See application file for complete search history.

(56) References Cited

U.S. PATENT DOCUMENTS

| | | | | |
|---|---|---|---|---|
| 5,328,248 A | * | 7/1994 | Nishiyama | 297/452.56 |
| 5,499,863 A | * | 3/1996 | Nakane et al. | 297/452.2 |
| 7,794,020 B2 | * | 9/2010 | Dallos et al. | 297/440.15 |
| 8,047,605 B2 | | 11/2011 | Yamazaki et al. | |

(Continued)

FOREIGN PATENT DOCUMENTS

| | | |
|---|---|---|
| CN | 102343837 | 2/2012 |
| CN | 103079886 | 5/2013 |

(Continued)

OTHER PUBLICATIONS

German Official Action for DE 102014219180.7 dated Nov. 7, 2014, along with an English-language translation thereof.
Official Action, along with English-language translation thereof, for CN Appl. No. 201410502618.8 mailed on Apr. 25, 2016.

*Primary Examiner* — Adriana Figueroa
(74) *Attorney, Agent, or Firm* — Greenblum & Bernstein, P.L.C.

(57) ABSTRACT

A seat frame for a conveyance seat includes a cushion frame, a back frame, and a recliner. The side frame on a back side is structured by a panel extending in a front-back direction. Flange parts directed towards a center side in a seat width direction are provided in both front and back edge parts of the panel, respectively. A bead that crosses a deformation line is formed on the panel so as to prevent deformation of the panel of the side frame on the back side due to displacement of the front side flange part towards the center side in the seat width direction with respect to a connecting part with the recliner when backward load is applied to the back frame, the deformation line being a line set on the panel on an assumption that deformation occurs.

4 Claims, 7 Drawing Sheets

(56) References Cited

U.S. PATENT DOCUMENTS

| | | | |
|---|---|---|---|
| 8,668,272 B2* | 3/2014 | Sankaran et al. | 297/452.18 |
| 8,870,293 B2* | 10/2014 | Seibold | B60N 2/68 |
| | | | 297/452.18 |
| 8,876,214 B2* | 11/2014 | Kroener et al. | 297/452.18 |
| 2005/0140190 A1* | 6/2005 | Kawashima | 297/216.14 |
| 2012/0025579 A1 | 2/2012 | Ono et al. | |
| 2014/0117728 A1 | 5/2014 | Nakanishi et al. | |

FOREIGN PATENT DOCUMENTS

| | | | |
|---|---|---|---|
| DE | 3239292 | 5/1983 | |
| DE | 3303069 | 8/1984 | |
| DE | 102009002912 | 6/2010 | |
| FR | 2539971 A1 * | 8/1984 | ............ A47C 1/025 |
| JP | 2008-067722 | 3/2008 | |
| JP | 2010-254109 | 11/2010 | |
| WO | 2007/111340 | 10/2007 | |

* cited by examiner

SEAT FRAME FOR CONVEYANCE SEAT

INCORPORATION BY REFERENCE

The disclosure of Japanese Patent Application No. 2013-204172 filed on September including the specification, drawings and abstract is incorporated herein by reference in its entirety.

BACKGROUND OF THE INVENTION

1. Field of the Invention

The invention relates to a seat frame of a seat mounted on a conveyance such as an automobile, an airplane, a ship, and a train.

2. Description of Related Art

A seat frame is a skeleton of a conveyance seat, and it is important to ensure that the seat frame has strength in every usage state. A side frame of a seat back has a sectional shape that is designed to ensure strength of the side frame. For example, a side frame of a seat back is structured by a panel that extends along a front-back direction, and flange parts, which are directed towards a center side in a seat width direction, are provided in both front and back edge parts of the panel for reinforcement (for example, see Japanese Patent Application Publication No. 2010-254109 (JP 2010-254109 A)).

SUMMARY OF THE INVENTION

In a case where a plate thickness of a side frame is reduced for weight reduction, when relatively large backward load is applied to a back frame, there is a possibility that a phenomenon could happen, in which a panel of the side frame is deformed in a way that a front side flange part falls towards a center side in a seat width direction from a lower side fixed end of the panel, which serves as a base end part. Therefore, it is not possible to reduce the plate thickness beyond a certain extent, which restricts weight reduction. The invention provides a seat frame for a conveyance seat in which a shape of a panel of a side frame suppresses deformation of the panel so that a plate thickness of the side frame is reduced while ensuring necessary strength of the back frame, thereby reducing a weight of the back frame.

A seat frame for a conveyance seat according to an aspect of the invention includes a cushion frame that is formed by arranging side frames on a cushion side on both left and right sides of the cushion frame, a back frame that is formed by arranging side frames on a back side on both left and right sides of the back frame, and a recliner that connects the side frame on the cushion side and the side frame on the back side with each other so as to be able to rotate. The side frame on the back side is structured by a panel that extends in a front-back direction. Flange parts directed towards a center side in a seat width direction are provided in both front and back edge parts of the panel, respectively. A bears that crosses a deformation line is formed on the panel so as to prevent deformation of the panel of the side frame on the back side due to displacement of the front side flange part towards the center side in the seat width direction with respect to a connecting part with the recliner when backward load is applied to the back frame, the deformation line being a line set on the panel on an assumption that deformation occurs. The bead may be provided so as to enhance bending strength of the panel in a direction that crosses the deformation line. According to the above aspect, the bead formed on the panel is provided so as to cross the deformation line that is formed on the panel of the side frame on the back side when the back frame receives backward load and the side frame on the back side is deformed. Therefore, the bead prevents the deformation line from being formed, and also prevents the side frame on the back side from being deformed as the back frame receives backward load. Hence, it is possible to reduce a plate thickness of the side frame on the back side while ensuring necessary strength of the back frame, thereby reducing a weight of the back frame.

In the above aspect, the side frame on the back side may have a bow shape that is convex to front, and the bead may be formed by conducting extrusion molding of a surface of the panel of the side frame on the back side to the center side in the seat width direction, and may be formed to cross a straight line that is a tangent line of the bow-shaped back side flange part and is a front side tangent line of the recliner mounted on the side frame on the back side. According to the above structure, it is possible to enhance strength of the bow-shaped side frame on the back side. Thus, it is possible to reduce a plate thickness of the side frame on the back side while ensuring necessary strength of the bow-shaped side frame on a back side, thereby reducing a weight of the back frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
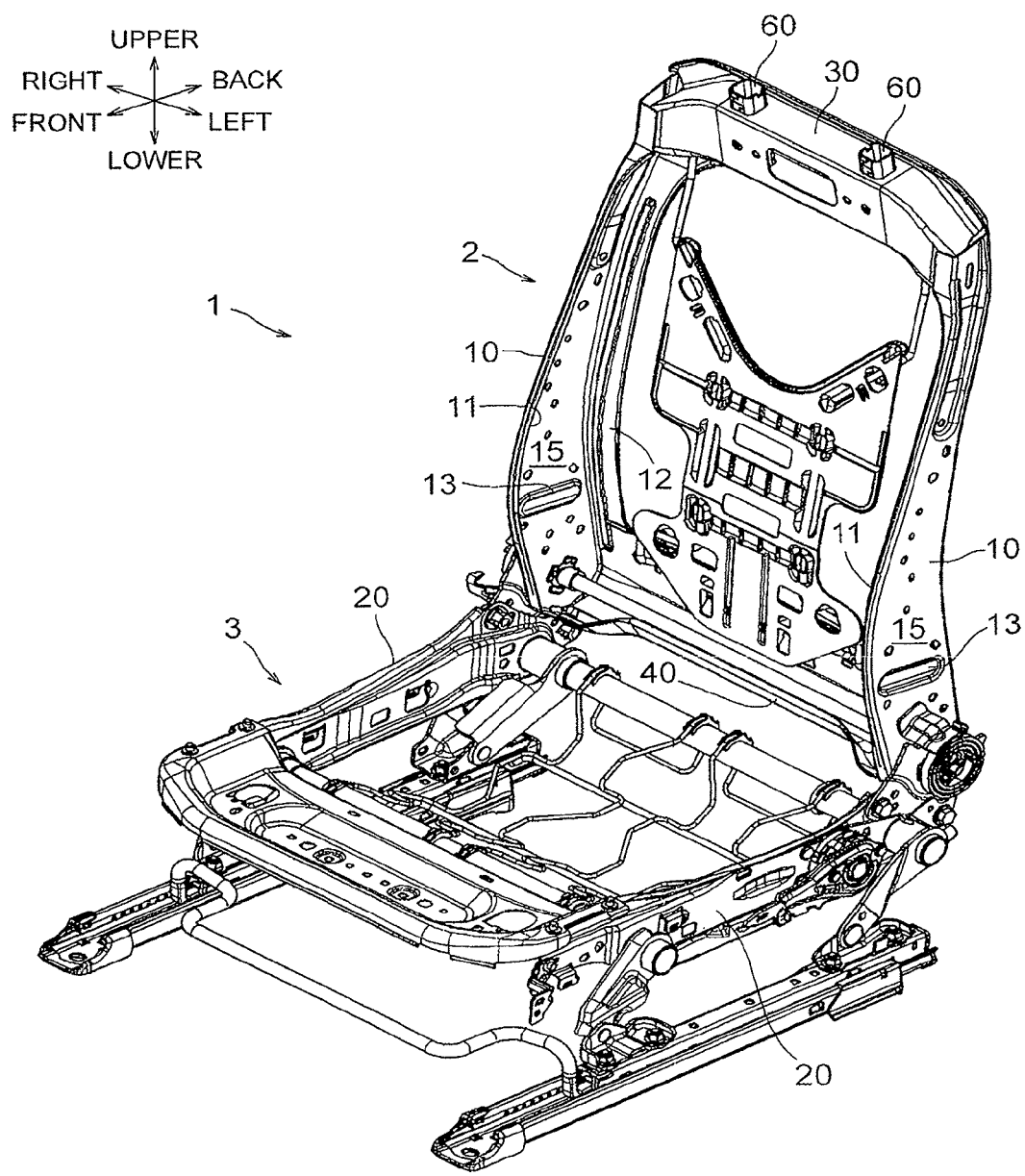
FIG. 1 is a perspective view of a first embodiment of the invention.
Figure 2:
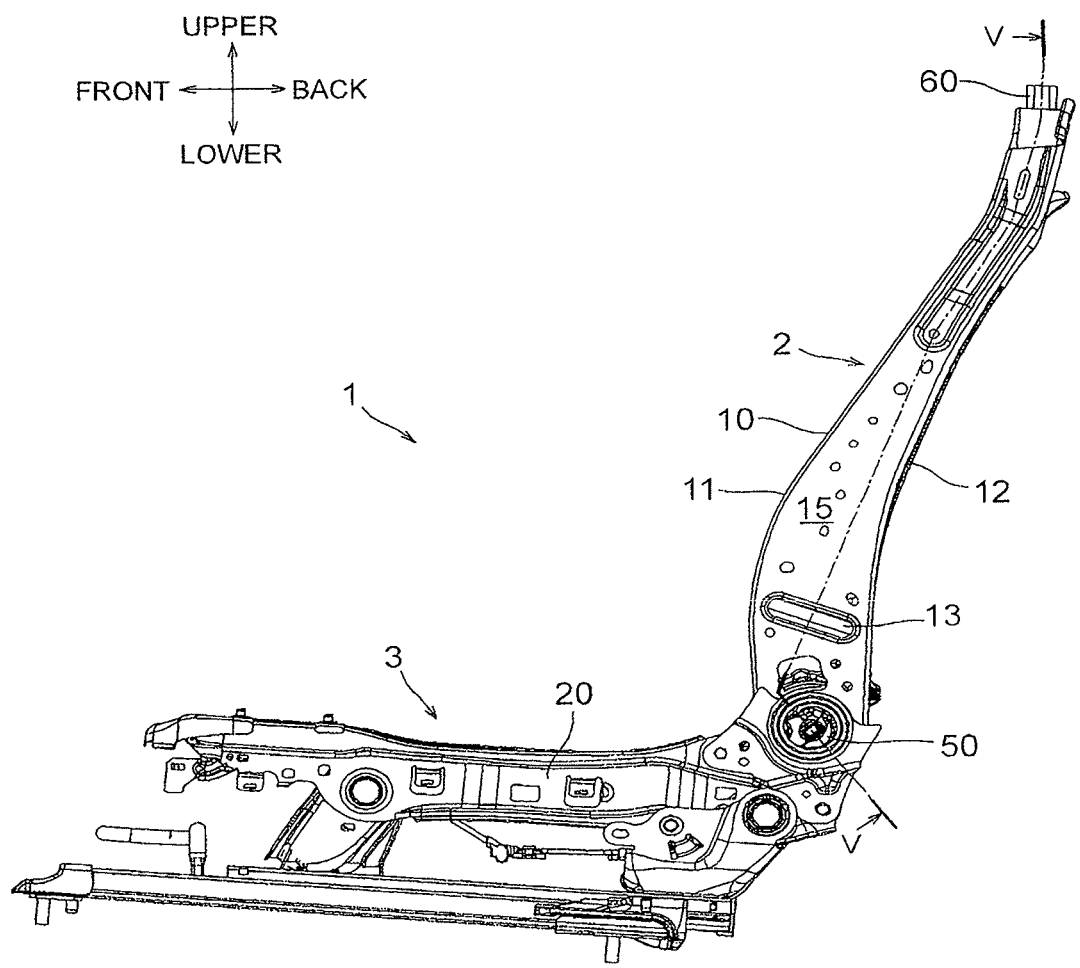
FIG. 2 is a side view of the embodiment.
Figure 3:
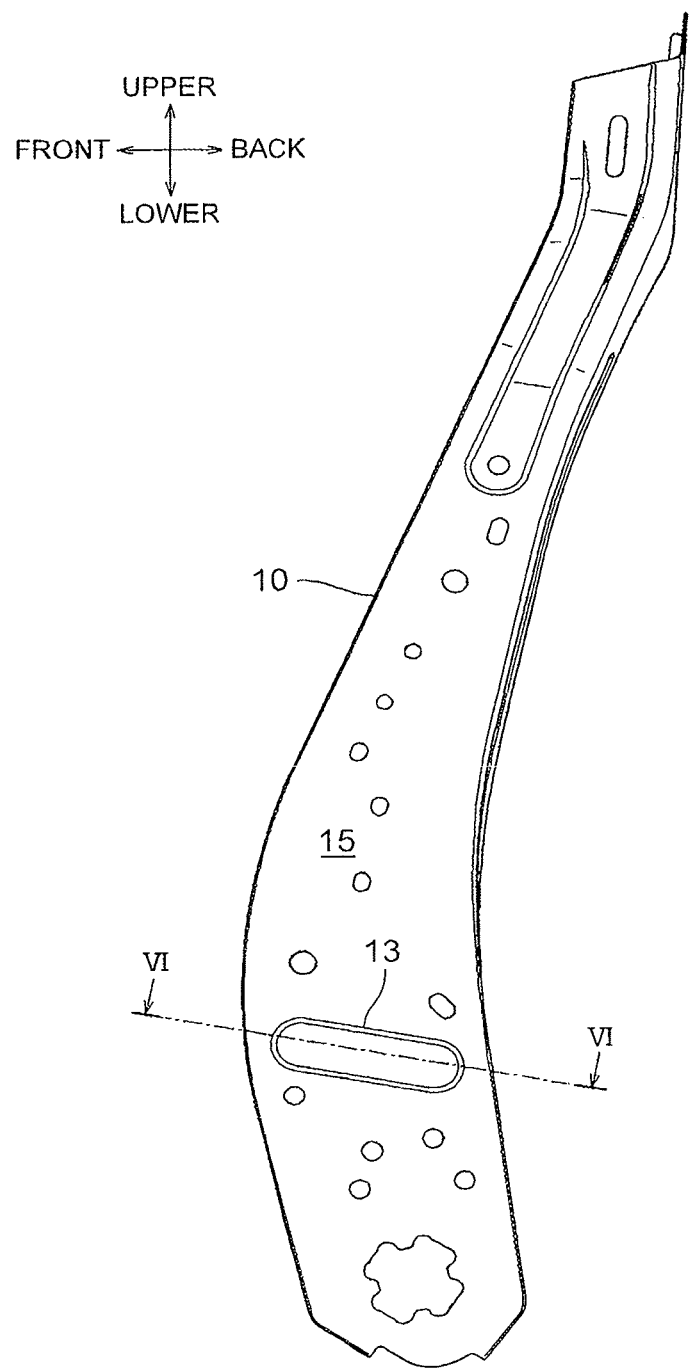
FIG. 3 is an enlarged side view of a side frame on a back side according to the embodiment.
Figure 4:
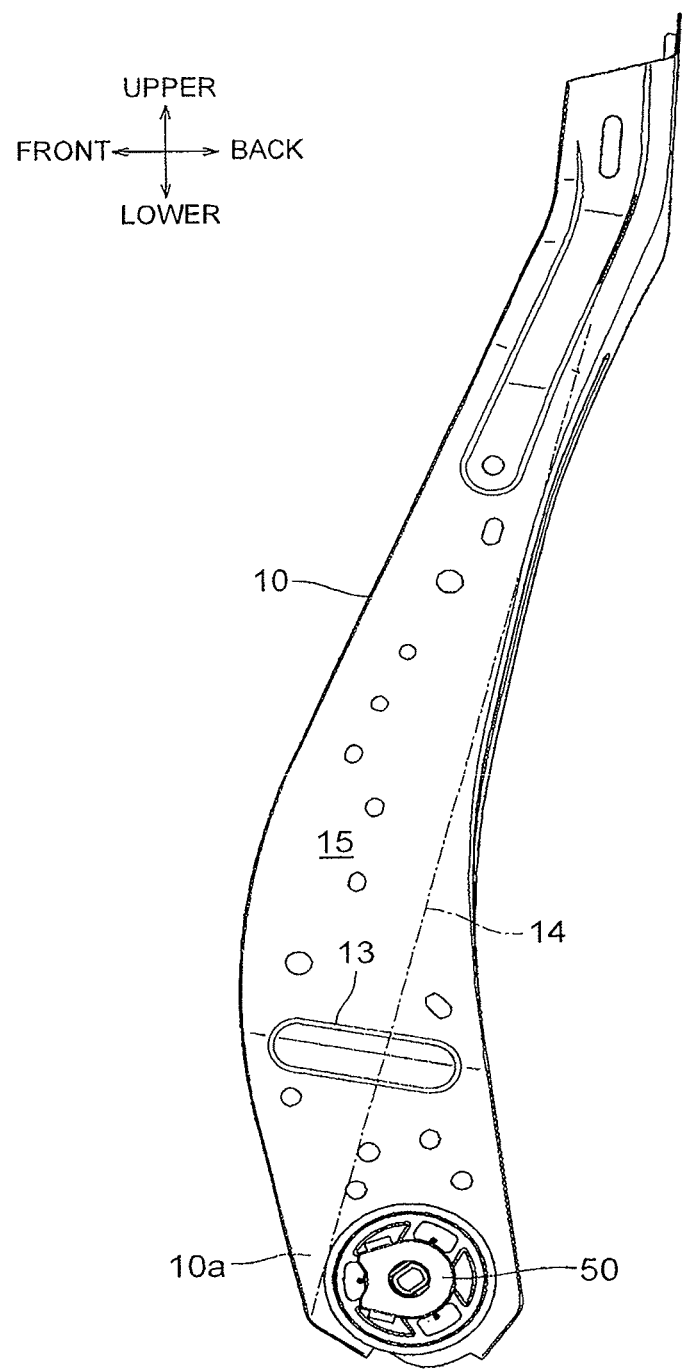
FIG. 4 is an explanatory view for forming a bead in the embodiment.
Figure 5:
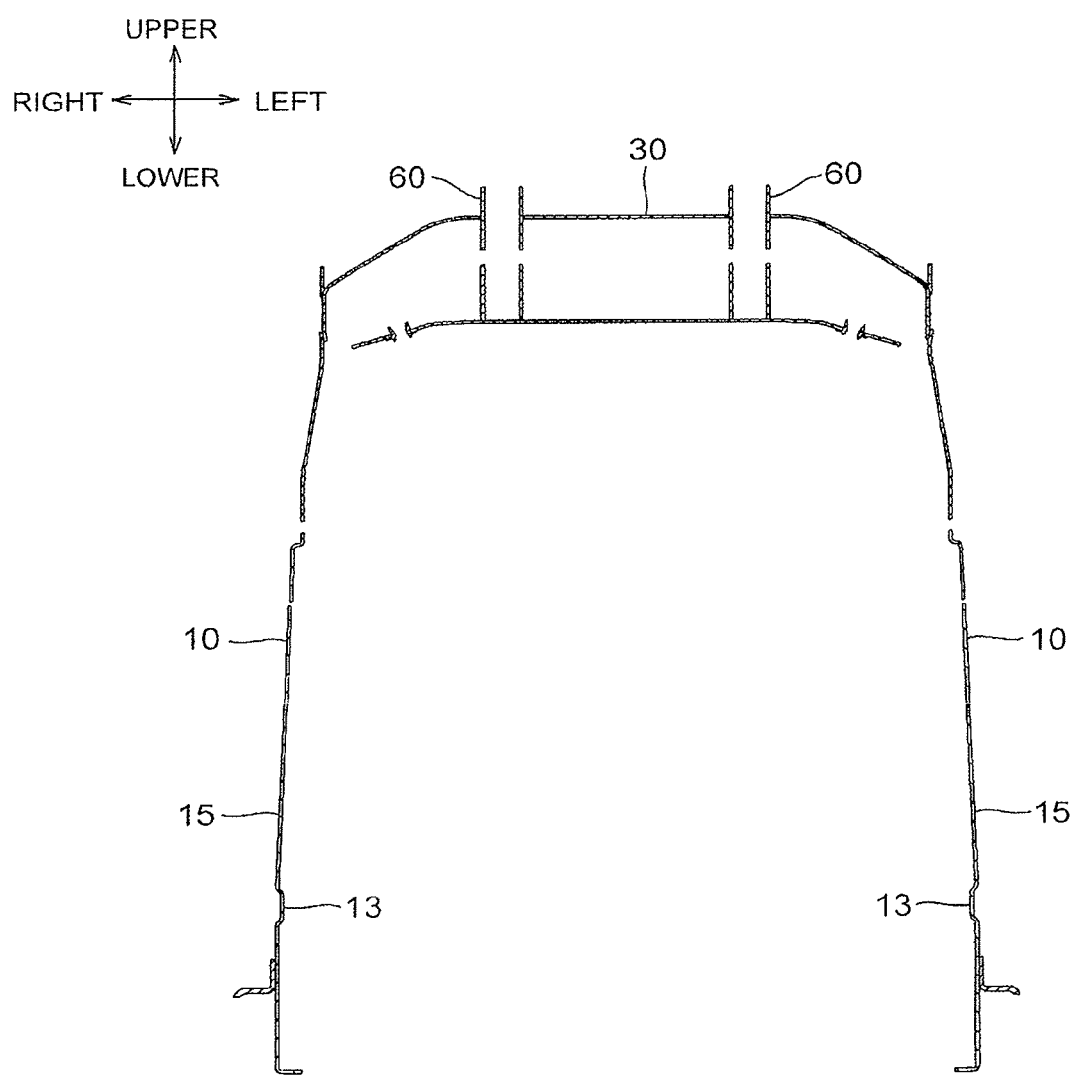
FIG. 5 is a sectional view taken along the line V-V in FIG. 2.
Figure 6:
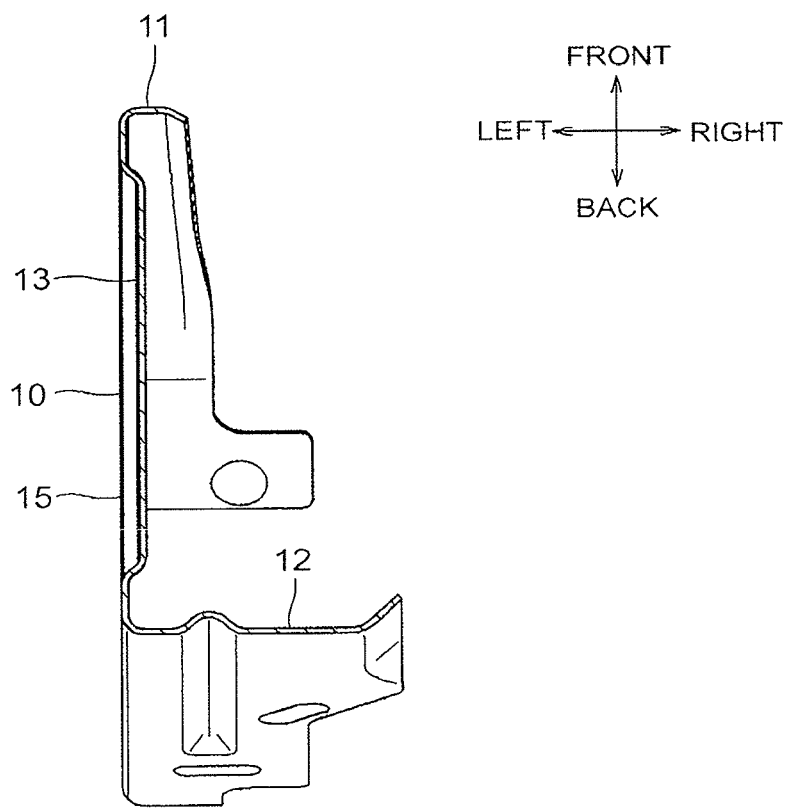
FIG. 6 is an enlarged sectional view taken along the line VI-VI of FIG. 3.

FIG. 1 to FIG. 6 show an embodiment of the invention. The embodiment shows an example in which the invention is applied to a front seat of an automobile (herein after, simply referred to as a seat). In the drawings, respective directions of the seat are shown by arrows. In the explanation below, descriptions regarding directions are based on these directions. A seat frame 1 that forms a skeleton of the seat is made by a combination of a back frame 2 and a cushion frame 3. The cushion frame 3 is formed by arranging side frames (examples of side frames on a cushion side in the invention) 20 on both left and right sides of the cushion frame 3, and the back frame 2 is formed by arranging side frames (examples of side frames on a back side in the invention) 10 on both left and right sides of the back frame 2. Upper and lower end parts of the both side frames 10 of the back frame 2 are welded and joined by an upper frame 30 and a lower frame 40, thus forming a casing-shaped frame. Each of the side frames 10 is made of a pressed iron plate (herein after, referred to as a panel) 15, and is provided so that most of a flat surface extends along a front-back direction. In each of the side frames 10, front side and back side flange parts 11, 12 are formed in both front and back edge parts of the panel 15 towards the opposing side frame 10, in other words, towards a center side in a seat width direction. Each of the side frames 10 including the front side and back side flange parts 11, 12 is formed in a bow shape that is convex to the front. Cylindrical head rest holders 60 for supporting a headrest (not shown) are fixed to both left and right sides of a center part of the upper frame 30.

On lower sides of the left and right side frames 10 and upper sides of mounting parts of recliners 50, extrusion molding by press forming is performed long in the front-back direction, thereby forming beads 13. The bead 13 is formed to have a length filling a front-back width of the lower side of the side frame 10, and a width that is a third of the length. An extrusion depth at a deepest part with respect to the panel 15 is about a twenty-fifth of the length. The extrusion molding is conducted so that the panel 15 extrudes towards the opposing side frame 10, in other words, towards the center side in the seat width direction. The bead 13 is formed to cross a straight line 14 that is a tangent line of the bow-shaped back side flange part 12 and is also a front side tangent line of a recliner 50 mounted on the side frame 10 (see FIG. 4). When the side frame 10 receives backward load and the panel 15 of the side frame 10 has a small plate thickness and thus does not have sufficient strength, the front side flange part 11 is deformed in a way that the front side flange part 1.1 falls towards the center side in the seat width direction from a lower side fixed end of the side frame 10, in other words, a front side part 10a of the mounting part of the recliner 50, which serves as a base end part. The straight line 14 coincides with a deformation line on the panel 15, which is formed due to the deformation.

Figure 7:
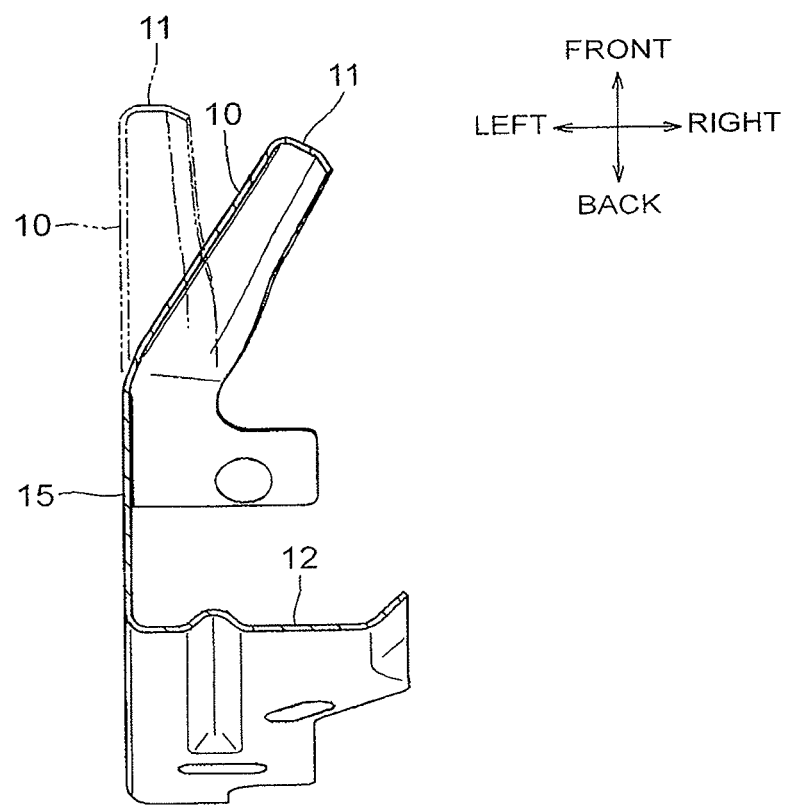
FIG. 7 is an explanatory view for explaining an effect of the invention, and is a sectional view corresponding to FIG. 6.

That is, the bead 13 that crosses the straight line is formed on the panel 15 so as to prevent deformation of the panel 15 of the side frame 10 on the back side due to displacement of the front side flange part 11, 12 towards the center side in the seat width direction with respect to a connecting part with the recliner 50 when backward load is applied to the back frame 2, the straight line being a line set on the panel 15 on an assumption that deformation occurs. FIG. 7 shows a state when the side frame 10 without the bead 13 is deformed. Since the bead 13 enhances bending strength of the panel 15 in a direction that crosses the deformation line, the bead 13 acts to suppress the deformation when the deformation is about to happen.

According to the above embodiment, the bead 13 formed in the panel 15 is able to suppress deformation of the side frame 10 as the back frame 2 receives backward load. Therefore, it is possible to reduce a plate thickness of the side frame 10 while ensuring necessary strength of the back frame 2, thereby reducing a weight of the back frame 2.

A specific embodiment has been explained so far. However, the invention is not limited to appearance and structure of the embodiment, and various changes, additions, and deletions may be made without changing the gist of the invention. For example, in the above embodiment, the side frame 10 of the back frame 2 is formed into a bow shape that is convex to the front. However, the invention may also be applied to the side frame 10 with a back end edge part formed by a straight line. The bow shape of the side frame 10 may also be formed by a combination of straight lines. In the foregoing embodiment, the invention is applied to an automobile seat, but may also be applied to a seat mounted on an airplane, a ship, a train, and so on.

What is claimed is:
1. A seat frame for a conveyance seat comprising:
   a cushion frame that is defined by side frames provided on a cushion side of the conveyance seat on both left and right sides of the cushion frame;
   a back frame that is defined by side frames provided on a back side of the conveyance seat on both left and right sides of the back frame; and
   a recliner that connects the left and right side frames on the cushion side to the left and right side frames on the back side so that the seat frame is rotatable, wherein
   the left and right side frames on the back side are each structured by a panel that extends in a front-back direction of the conveyance seat,
   flange parts directed towards a center side in a seat width direction of the conveyance seat are provided in both front and back edge parts of each panel, respectively,
   each side frame on the back side at the back edge flange part has a bow shape that is convex toward a front side of the side frame in the front-back direction of the conveyance seat, and
   a bead that crosses a deformation line is provided on each panel so as to prevent deformation of each panel of each side frame on the back side due to displacement of a front side flange part towards the center side in the seat width direction with respect to a connecting part with the recliner when a backward load is applied to the back frame, the deformation line being a straight line in a side view of the side frame that is a tangent line of the bow shape on the back side of the side frame at the back edge flange part and is a front side tangent line of an outer periphery of the recliner mounted on the side frame on the back side.
2. The seat frame according to claim 1, wherein
the bead is provided so as to enhance bending strength of the panel in a direction that crosses the deformation line.
3. The seat frame according to claim 1, wherein
the bead is provided on a lower side of each side frame on the back side and has a length generally extending in the front-back direction of the conveyance seat and a width generally extending in a height direction of the conveyance seat that is one-third of the length.
4. The seat frame according to claim 1, wherein
the bead is spaced from and provided above an upper side of the recliner and below the bow-shaped back edge flange part.

* * * * *